(12) United States Patent
Gupta

(10) Patent No.: US 11,294,925 B2
(45) Date of Patent: Apr. 5, 2022

(54) METHODS FOR IMPLEMENTING AND USING A DATABASE ACTUATOR

(71) Applicant: JPMorgan Chase Bank, N.A., New York, NY (US)

(72) Inventor: Anurag Gupta, Uttar Pradesh (IN)

(73) Assignee: JPMorgan Chase Bank, N.A., New York, NY (US)

( * ) Notice: Subject to any disclaimer, the term of this patent is extended or adjusted under 35 U.S.C. 154(b) by 383 days.

(21) Appl. No.: 16/139,866

(22) Filed: Sep. 24, 2018

(65) Prior Publication Data
US 2020/0097561 A1  Mar. 26, 2020

(51) Int. Cl.
G06F 16/00 (2019.01)
G06F 16/25 (2019.01)
G06F 16/95 (2019.01)
G06F 16/242 (2019.01)
G06F 16/2455 (2019.01)
G06F 16/30 (2019.01)

(52) U.S. Cl.
CPC ........ *G06F 16/252* (2019.01); *G06F 16/2428* (2019.01); *G06F 16/2433* (2019.01); *G06F 16/2455* (2019.01); *G06F 16/95* (2019.01)

(58) Field of Classification Search
None
See application file for complete search history.

(56) References Cited

U.S. PATENT DOCUMENTS

| | | | | |
|---|---|---|---|---|
| 8,412,696 | B2* | 4/2013 | Zhang | G06F 16/2471 |
| | | | | 707/706 |
| 8,806,361 | B1* | 8/2014 | Noel | G06F 3/04842 |
| | | | | 715/771 |
| 9,940,365 | B2* | 4/2018 | Zoryn | G06F 16/24578 |
| 10,909,130 | B1* | 2/2021 | Scott | G06F 16/244 |
| 2006/0200772 | A1* | 9/2006 | Dhanapal | G06Q 10/06 |
| | | | | 715/760 |
| 2006/0253423 | A1* | 11/2006 | McLane | G06F 16/951 |
| 2008/0183669 | A1* | 7/2008 | Gaurav | G06F 16/338 |
| 2008/0243784 | A1* | 10/2008 | Stading | G06F 16/3331 |
| 2008/0270420 | A1* | 10/2008 | Rosenberg | G16H 10/20 |
| 2009/0006334 | A1* | 1/2009 | MacLaurin | G06F 16/951 |

(Continued)

OTHER PUBLICATIONS

Sunderic et al. "SQLSERVER 2000, Stored Procedure Programming", 2001 McGraw-Hill/Osborne (Year: 2001).*

*Primary Examiner* — Polina G Peach
(74) *Attorney, Agent, or Firm* — Hunton Andrews Kurth LLP

(57) ABSTRACT

An embodiment of the present invention is directed to a database actuator tool that makes data readily available and enable users to focus on solving the problem rather than searching for data. The database actuator tool represents a browser-based application that may be used to create, store and/or execute a repository of frequently used or needed queries, e.g., SQL queries, using a very friendly and easily configurable user interface. The database actuator tool provides a configure-once and usable-forever by anyone with right entitlements solution. This provides a substantial productivity boost to a team that has a mix of developers and non-developers, including users with and without SQL knowledge. The database actuator tool may be used by various teams and/or applications.

17 Claims, 9 Drawing Sheets

(56) References Cited

U.S. PATENT DOCUMENTS

| | | | | |
|---|---|---|---|---|
| 2009/0254971 | A1* | 10/2009 | Herz | G06Q 30/02 |
| | | | | 726/1 |
| 2010/0293178 | A1* | 11/2010 | Govani | G06Q 30/0256 |
| | | | | 707/759 |
| 2012/0158783 | A1* | 6/2012 | Nice | G06Q 50/01 |
| | | | | 707/776 |
| 2012/0246173 | A1* | 9/2012 | Wittmer | G06F 16/3322 |
| | | | | 707/749 |
| 2013/0018869 | A1* | 1/2013 | Hanson | G06F 16/951 |
| | | | | 707/722 |
| 2013/0124552 | A1* | 5/2013 | Stevenson | G06F 16/951 |
| | | | | 707/759 |
| 2013/0151504 | A1* | 6/2013 | Konig | G06F 16/245 |
| | | | | 707/718 |
| 2014/0074889 | A1* | 3/2014 | Neels | G06F 16/248 |
| | | | | 707/779 |
| 2014/0317130 | A1* | 10/2014 | Thope | G06F 16/245 |
| | | | | 707/754 |
| 2015/0169767 | A1* | 6/2015 | De Datta | G06F 16/9577 |
| | | | | 707/706 |
| 2015/0178353 | A1* | 6/2015 | Hubauer | G06F 16/24568 |
| | | | | 707/771 |
| 2016/0019316 | A1* | 1/2016 | Murphey | G06F 16/907 |
| | | | | 707/722 |
| 2016/0110265 | A1* | 4/2016 | Athani | G06F 16/22 |
| | | | | 707/654 |
| 2016/0344758 | A1* | 11/2016 | Cohen | G08B 21/18 |
| 2017/0017683 | A1* | 1/2017 | Fourny | G06F 16/2272 |
| 2017/0046438 | A1* | 2/2017 | Desineni | G06F 16/24552 |
| 2018/0121472 | A1* | 5/2018 | Gaikwad | G06F 16/2365 |

\* cited by examiner

| | MEDIA COMMERCE COMPANY XYZ | INSTANTDB | SIT1 | SIT2 | SIT3 | S5 | DAT1 | DAT2 | DAT3 | DAT4 | DAT5 | |
|---|---|---|---|---|---|---|---|---|---|---|---|---|
| | COMMERCE COMPANY XYZ | | | | | | | | | | | |
| | FROM ARTISTS | | | | | | | | | | | |
| | ALL ARTISTS Results | | Total Rows 275 | CTT | 404 | STT 2 | Refresh | Email | Download | | | |
| | Show [10▼] entries | | | | | | | | Search | | | |
| | INDEX ◆▼ | ArtistId ◆▼ | NAME ◆▼ | | | | | | | | | |
| | 1 | 43 | A Car Do Som | | | | | | | | | |
| | 2 | 230 | Aaron Copeland & London Symphony Orchestra | | | | | | | | | |
| | 3 | 203 | Aaron Goldberg | | | | | | | | | |
| | 4 | 230 | ACDC | | | | | | | | | |
| | 5 | 214 | Academy of St. Martin in the Fields & Sir Neville Marriner | | | | | | | | | |
| | 6 | 215 | Academy of St. Martin in the Fields Chamber Ensemble & Sir Neville Marriner | | | | | | | | | |
| | 7 | 222 | Academy of St. Martin in the Fields, John Birch, Sir Neville Marriner | | | | | | | | | |
| | 8 | 237 | Academy of St. Martin in the Fields, Sir Neville Marriner & Thurston Dart | | | | | | | | | |
| | 9 | 240 | Academy of St. Martin in the Fields, Sir Neville Marriner & William Bennett | | | | | | | | | |
| | 10 | 2 | Accept | | | | | | | | | |
| | Showing 1 to 10 of 275 entries | | | | | | | | | | | |

Static Queries Links
410

[01] ALL_ARTISTS
[02] ALL_MEDIA TYPES
[03] ALL_TRACKS

ALL_COLUMNS
ALL_TABLES
ALL_TABLES_COLUMNS
Search all columns of all tables | Search |

Select Any Item To Update
▸[2] xyz's mxxxxxx
▸[3] xyz's mxxxxxx

| | | | | | | | | | | | |
|---|---|---|---|---|---|---|---|---|---|---|---|
| ▼ [1]XYZ | DB ALUM DATA | | | | | | | | | | |
| BY ALBUM TITLE | ▼ | | | | | | | | | | |
| TheWorldofClassicalFavourite | S— | | | | | | | | | | |
| [01] ALL_ARTISTS | | | | | | | | | | | |
| [02] ALL_MEDIA TYPES | | | | | | | | | | | |
| [03] ALL_TRACKS | | | | | | | | | | | |
| ALL_COLUMNS | | | | | | | | | | | |
| ALL_TABLES | | | | | | | | | | | |
| ALL_TABLES_COLUMNS | | | | | | | | | | | |
| Search in all columns of all tables Search | | | | | | | | | | | |
| --Select Any Item To Update-- | ▼ | | | | | | | | | | |
| ▶ [2]XYZ's Media D8 Customer Data | | | | | | | | | | | |
| ▶ [3]XYZ's Media D8 Invoice Data | | | | | | | | | | | |

510, 512

| DEMO MEDIA ECOMMERCE COMPANY XYZ | INSTANT DB | ST1 | ST2 | ST3 | S5 | DAT1 | DAT2 | DAT3 | DAT4 | DAT5 |
|---|---|---|---|---|---|---|---|---|---|---|
| DEMO MEDIA ECOMMERCE COMPANY XYZ | | | | | | | | | | Hide/Show Copy SQL SQL |
| Select albums, title, name from albums & artists to where a xxxxxxxxxxxxxx like the World of Classical Favourites | | | | | | | | | | |
| BY_ALBUM_TITLE with (The World of Classical Favourites) Result  Total Rows 1 CTT 286 STT 1  Refresh Email Download | | | | | | | | | | |
| Show 5 ▼ entries | | | | | | | | | Search: | |

| INDEX ▲▼ | Albumid ▲▼ | Title ▲▼ | Name ▲▼ |
|---|---|---|---|
| 1 | 2M | The World of Classical Favourites | Academy of St. Martin in the Fields & Sir Neville Marriner |

Showing 1 to 1 of 1 entries

| INDEX | TABLE_NAME | NUM_ROWS | LAST_ANALYZED | TABLESPACE_NAME |
|---|---|---|---|---|
| 1 | | 6 | 2018-07-12 23.02.38 | VET |
| 2 | | 303 | 2018-07-26 23.01.34 | VET |
| 3 | MESSAGE_EVENT — Table name with hyperlink (810) | 50 | 2018-07-26 23.02.14 | VET |
| 4 | | 50 | 2018-07-26 23.02.15 | VET |
| 5 | | | | |

Showing 1 to 5 of 6 entries (filtered from 224 total entries)

Select TABLE,NAME,NUM_ROWS,LAST_ANALYZED,TABLESPACE_NAME From ALL,ALL TABLES where OWNER in (select user from dual)

All Available Tables Result — TOTAL ROWS 224 CTS 632 STT 3057 Refresh Email Download

INSTANT DB ANARAG

Tabs: SIT1 | SIT2 | SIT3 | S5 | UAT1 | UATPP | UAT2 | UAT3 | UAT4 | UAT5 | an001 | an002 | an003 | an004 | an005 | an006 | an007

Hide/Show Copy SQL Select SQL

Search: Message

Show 5 entries

--Select Any Named Query--
Search

[01] O_SAMPLE_TM5 FOR TEST
[02] CSW_SOD_TRIGGERED
[03] DISTINCT_PRODUCT_NAME
[04] PRODUCT_FAMILYs
[05] STP_PAUSED_TRANSACTION
[06] distinct_message_function
[07] distinct_status ALL TABLES
ALL,TABLES,AND,COLUMNS
Pseudo_Tables Search in all columns of all tables [Search]

--Select Any Item To Update-- v 01. acy Trade Details
v 02. ridge Trade Details

Figure 9

METHODS FOR IMPLEMENTING AND USING A DATABASE ACTUATOR

FIELD OF THE INVENTION

The invention relates generally to methods for implementing and using a database actuator to facilitate database search and access.

BACKGROUND OF THE INVENTION

Most applications have a standard architecture stack which includes Database, Services and User Interface (UI) as core components. The information made available to the user (e.g., client, operations, etc.) is via a graphical user interface (GUI). Much of the information resides in the Database which is usually not exposed for data integrity and other security reasons. The information stored and maintained in the Database is generally useful to Application developers and Production management teams for troubleshooting issues. In an example involving a trade life cycle, internal information may include when the trade came into the system and when it was processed out and not be exposed via GUI. Accessing information of such a level of detail especially while supporting production issues, requires a knowledgeable person to run queries in the database and gather additional details on the trade for analysis. This current model usually has a dependency on an SME or person with enough documentation on how to access data. Time and effort taken to actually get to the root cause of the issue is increased because of the additional effort required in acquiring the data itself from the system. Such delays in resolution could lead to applications missing their SLAs and adverse financial and reputational impact.

To gather data required for analysis by a user, conventional systems require a series of complex and manual steps. For example, a user may be required to invoke the following set of steps: raise a request or send mail to technology team; request prioritization takes place based on current book of work; technology team gets assigned the request for fulfillment; technology team to analyze the request and identify how the same can be served; technology team to prepare programmatic queries to fetch the data from database; technology team to make access request for production database; technology team post access to database, execute the query and fetch the data into a spreadsheet; technology team then sends the data to the user via email or other means; technology team then disconnects from the environment and closes the request and carries out attestation activity for the usage of data; and user extracts information from excel via filter, sorting and other capabilities. The conventional method requires an overall time in carrying out this activity between 2 hours to 72 hours based on its criticality.

These and other drawbacks currently exist.

SUMMARY OF THE INVENTION

According to one embodiment, the invention relates to a computer implemented method that implements a database actuator to execute database queries. The method comprises the steps of: electronically connecting with one or more database systems and serves; identifying a set of tasks for the one or more database systems and servers; responsive to the set of tasks; automatically generating a set of queries that are preconfigured and made available via an interactive user interface that provides a single interface to search directly in the one or more database systems and servers; storing the set of queries in a database; identifying, via the interactive user interface, a user input, wherein the interactive user interface displays static queries and dynamic queries; and responsive to the user input, automatically executing a query, via a query executor, wherein each query structure is predefined and available on the interactive user interface to avoid user generated queries.

The computer implemented methods described herein provide unique advantages and various benefits to financial institutions, banking clients and other entities, according to various embodiments of the invention. An embodiment of the present invention reduces the time it takes to troubleshoot and make things readily available for analyzing information rather than searching for data. For example, an embodiment of the present invention achieves significant time efficiencies for each user reducing time from 72 hours to approximately 5-10 minutes. Because there is no dependency on individuals to be able to provide data, an embodiment of the present invention also achieves significant increased productivity. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 4 represents an exemplary Static Queries interface of a Database Actuator, according to an embodiment of the present invention.

FIG. 5 represents an exemplary Dynamic Queries interface of a Database Actuator, according to an embodiment of the present invention.

FIG. 8 represents an exemplary Developer interface of a Database Actuator, according to an embodiment of the present invention.

FIG. 9 represents an exemplary Developer interface of a Database Actuator, according to an embodiment of the present invention.

DETAILED DESCRIPTION OF THE PREFERRED EMBODIMENT(S)

Figure 1:
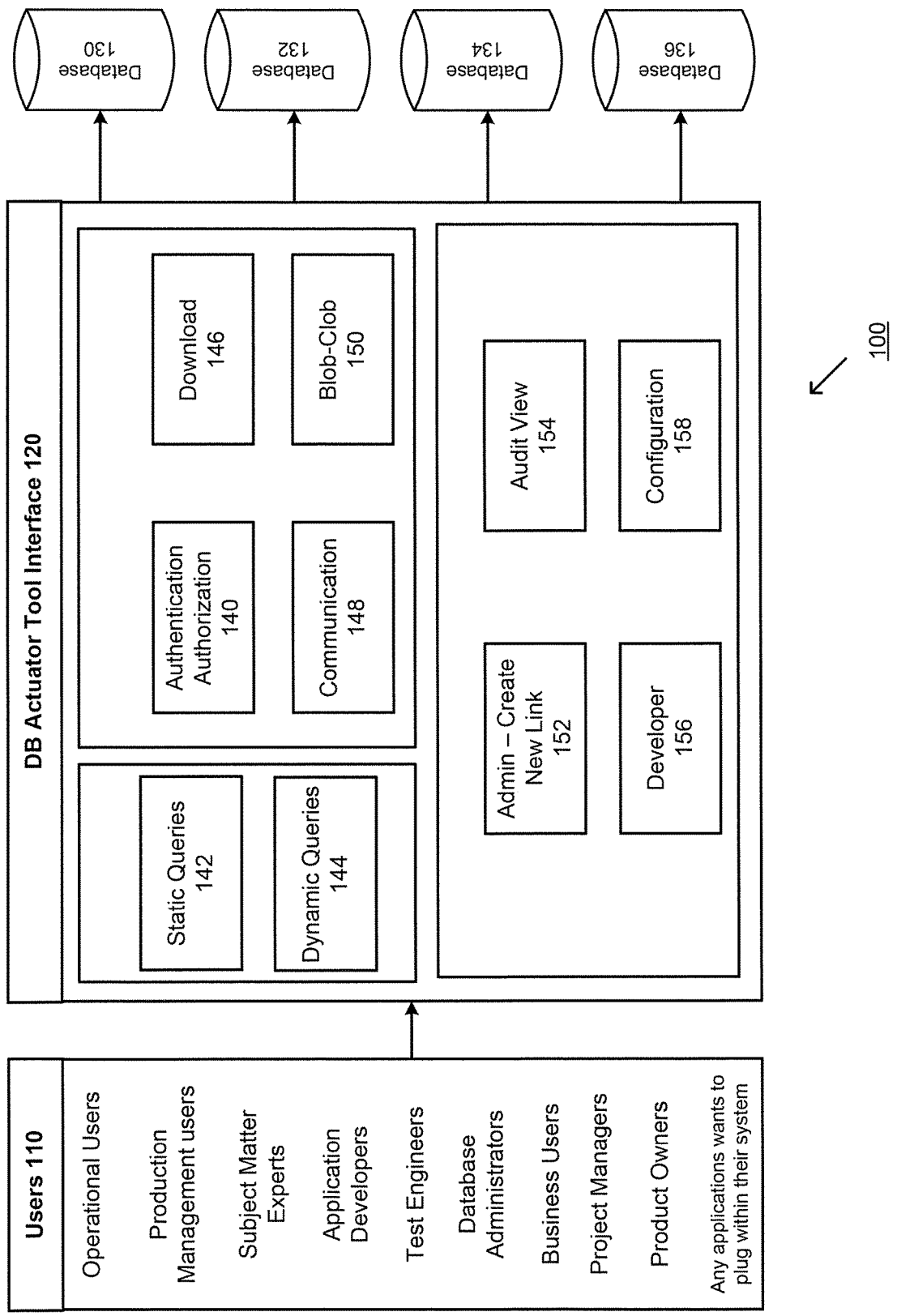
FIG. 1 is a schematic diagram of a system that implements a database actuator, according to an exemplary embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a database actuator tool that makes data readily available and enables users to focus on solving problems rather than searching for data. The database actuator tool represents a browser-based application that may be used to create, store and/or execute a repository of frequently used or needed queries, e.g., SQL queries, using a user friendly and easily configurable interactive interface. The database actuator tool provides a configure-once and usable-forever by anyone with right entitlements solution. This provides a substantial productivity boost to a team that has a mix of developers and non-developers, including users with and without SQL knowledge. The database actuator tool may be used by various teams and/or applications. The database actuator tool is directed to simplifying the daily work of application developer (AD), quality assurance (QA), user acceptance testing (UAT), Business Analyst (BA), teams who support production environments but also increasing productivity of each user. Moreover, Production Support may be greatly simplified with the usage of this tool and time for resolving production client impacting issues may be greatly reduced.

According to an embodiment of the present invention, the database actuator tool achieves significant time efficiencies for each user. With the database actuator tool, there is no dependency on individuals to be able to provide data. In addition, an embodiment of the present invention connects to multiple databases and provides consistent views with a single login or interface. This may be provided by a One Click View capability for showing data to users. Information may be accessible to all (or a subset of) users without having to write complex queries or a need for any knowledge of the database. An embodiment of the present invention further provides a single interface for multiple applications and development environments to make the data available. The database actuator may be easily configured for any application or product within minutes and further customized as per an application's requirement. According to an embodiment of the present invention, the database actuator may be platform independent. And, because the queries are pre-defined, there is no possibility of any "human error." The database actuator also provides an in-built capability for data sorting, searching and filtering within an application. For example, a new query set may be configured and/or added quickly without a need for any release of software. The database actuator also provides a search capability to enable users to search data across multiple views. The queries may include static as well as dynamic queries. The database actuator may also execute various nested and/or linked queries and further provide relationship data between different tables. Security may be enforced by an application team on the visibility of the content to the user.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

FIG. 1 is a schematic diagram of a system that implements a database actuator, according to an exemplary embodiment of the present invention. Users 110 may access an interface of a database actuator tool, as represented by 120. User 110 may communicate via various user devices, such as a computer, laptop, terminal, kiosk, a smart device, a mobile device, tablet, and/or other computing device. Users 110 may communicate via a network communication channel.

Database Actuator Tool Interface 120 may include various modules and functionality. For example, predetermined queries may be available in the form of Static Queries 142 and Dynamic Queries 144. Interface 120 may provide functions relating to Authentication and Authorization 140, Download 146, Communication 148 and Blob-Clob 150. In addition, users may perform actions relating to Administration 152, Audit View 154, Developer 156 and Configuration 158.

Authentication and Authorization 140 may provide an interface to enable user authentication and authorization which may be easily enabled and disabled as desired. Upon access, a user may view a set of configured environments and associated groups. The user may then select a desired environment by selecting a tab and then access various preconfigured options and queries.

Static Queries 142 represent preconfigured queries that retrieve information without any user input. FIG. 4 represents an exemplary Static Queries interface of a Database Actuator, according to an embodiment of the present invention. Static Queries Links 410 are represented as [01] All Artists; [02] All Media Types and [03] All Tracks. By selecting static query [01], a display of all artists is shown at 420.

For Dynamic Queries 144, a user may select an identifier type which may be selected from a drop down menu and then provide a search input into a text box or other input interface. FIG. 5 represents an exemplary Dynamic Queries interface of a Database Actuator, according to an embodiment of the present invention. At 510, an identifier type (or any named query) may be selected from a drop down window. In this example, the identifier type is shown as "By_Album_Title." In this example, other identifier types may be shown, such as "By_Artist_Name." User Input, such as search input, may be provided at 512. In this example, an album title is provided and corresponding results are shown at 520.

Download 146 provides a download feature where search results may be downloaded into various formats.

Figure 6:
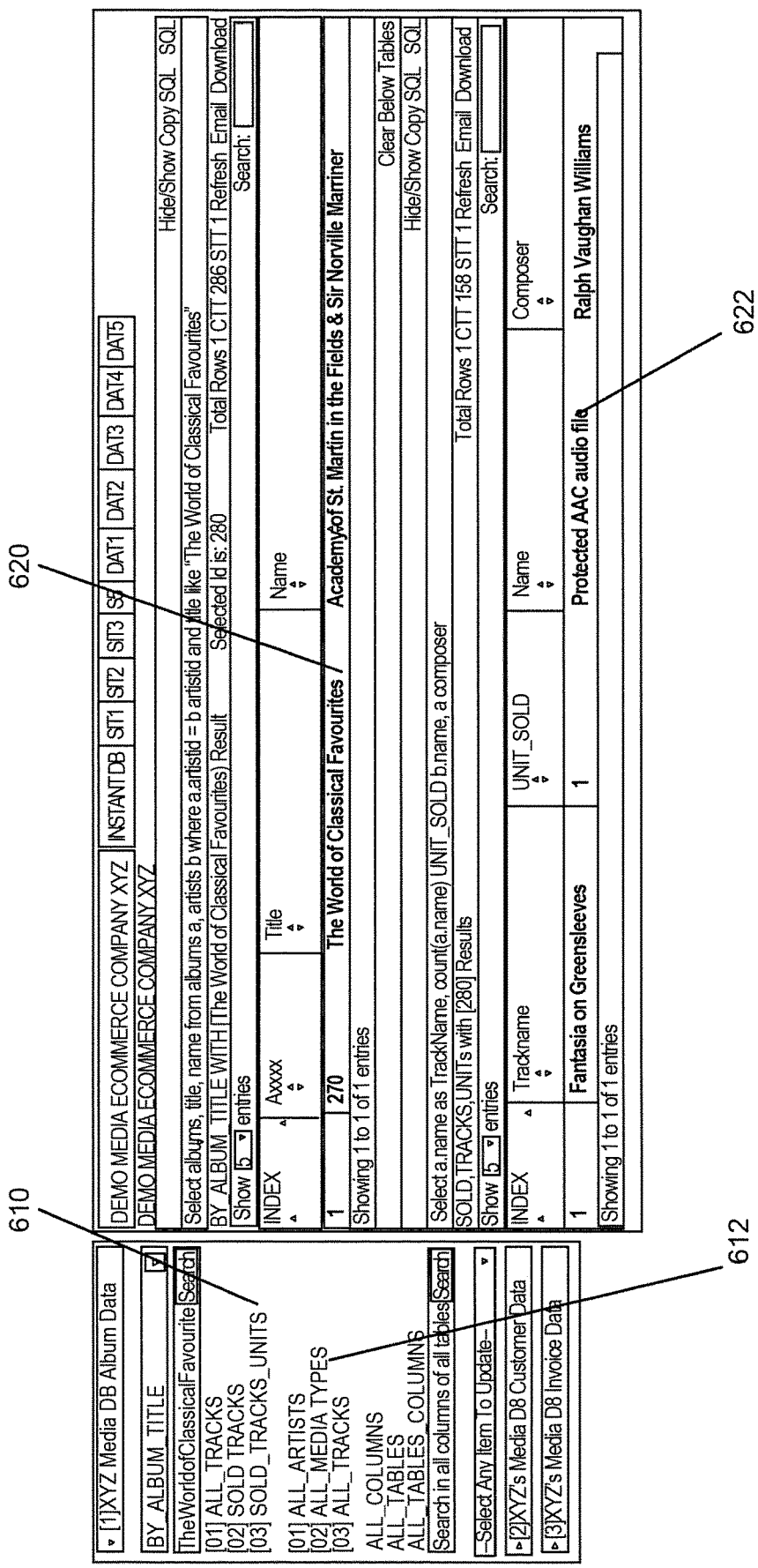
FIG. 6 represents an exemplary Linked Queries interface of a Database Actuator, according to an embodiment of the present invention.

Communication 148 provides a communication option where a user may export results and send in an email communication to one or more recipients. This feature may be available for dynamic and static query result sets. To view the information of a searched trade in details, a user may select, click on the record/row and then click on the table links available in left pane. FIG. 6 represents an exemplary Linked Queries interface of a Database Actuator, according to an embodiment of the present invention. As shown in FIG. 6, there are three linked tables/links populated which may be used to access the related details by a user interaction, such as a single click. Section 610 illustrates Linked Queries that are displayed as a user clicks on any row in a table, such as Row 620. Section 612 represents Static Queries. When a user selects on a table/link populated in Section 610, related data may then be displayed in tabular format at 622. Other formats may be displayed as well. As shown in FIG. 6, a user may select row or record 620, and then select [03] SOLD_TRACKS_UNITS at 610 and corresponding detail may be provided at 622.

Blob-Clob 150 displays a "Blob-Clob" (Binary large object-Character large object) text type data which may be stored into a Database. For example, the interface may provide the user's original instruction (e.g., SWIFT Message) and also 20022 (XML message) on single click. An embodiment of the present invention provides text type data instantly without requiring multiple steps to view and access raw text as required by current tools.

Figure 7:
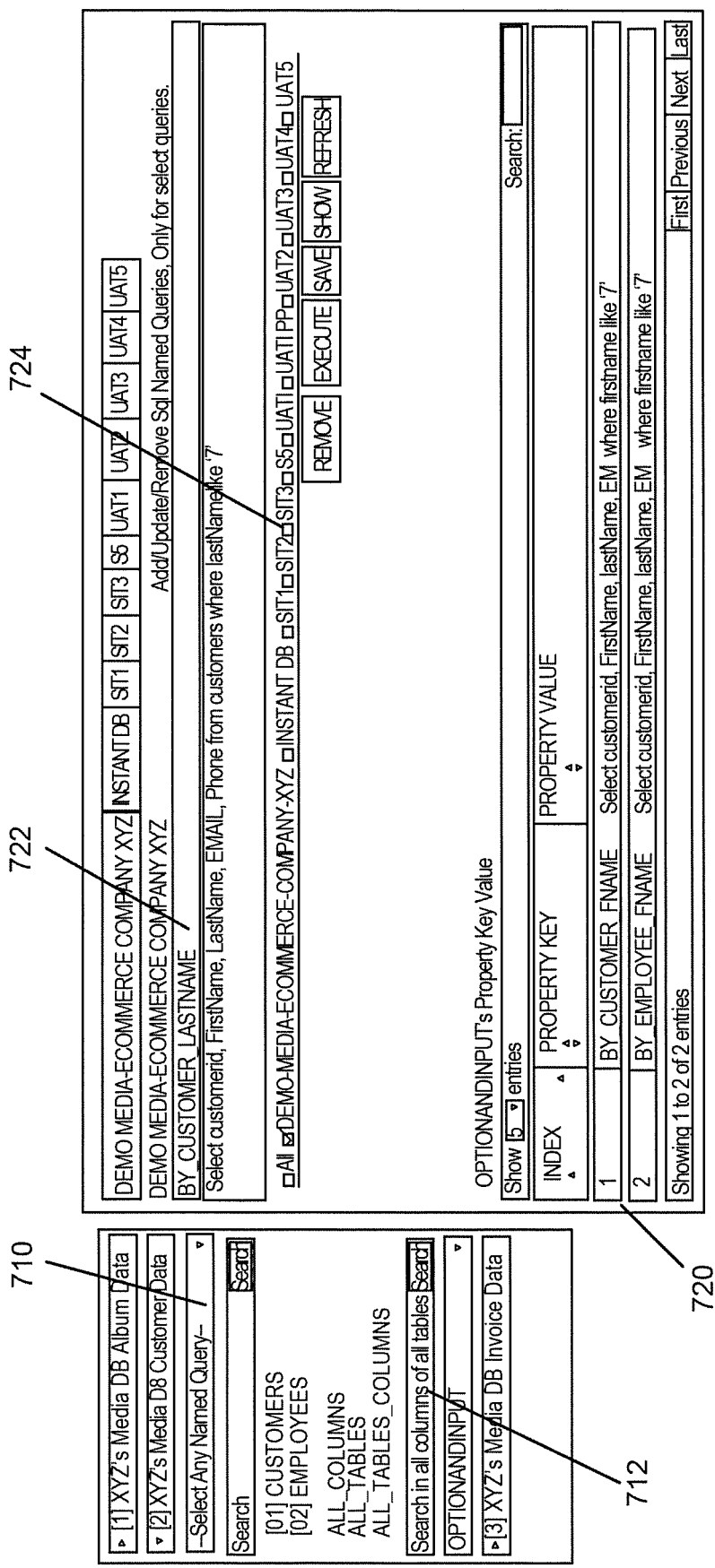
FIG. 7 represents an exemplary Administration interface of a Database Actuator, according to an embodiment of the present invention.

Administration 152 enables an administrator to create a new link as well as update existing links. For example, an administrator may add, update and/or remove the query links, including static or dynamic queries. For example, with all Dynamic Queries displayed on the screen, a user may choose a desired Dynamic Query to change by clicking a corresponding row. FIG. 7 represents an exemplary user interface of an Administration interface of a Database Actuator, according to an embodiment of the present invention. Available dynamic queries may be shown at 710. For example, dynamic queries may include "By_Customer_FName" and "By_Employee_FName" which would be displayed at 710. The user (e.g., administrator) may then select any item to update, which may be environment specific. For example, the administrator may select an item from a drop down window at 712. In this example, the administrator may select an "Option and Input" item. All dynamic queries may be displayed and the user may then select a desired dynamic query for any change.

As shown in FIG. 7, an administrator may add a new Static Query at 722. In this example, a user is adding a new query called "By_Customer_LastName" at 722. The database actuator tool provides flexibility to add the same static Query in multiple environments in "One Go" itself. There is no need to create and/or copy the same static query in multiple environments separately. As shown by 724, desired environments may be selected for the new query. By selecting an environment, the new query may be configured into that environment. Existing dynamic queries as shown at 720. Post addition of a new "Dynamic Query," the system may automatically increment the query count displayed to the user, at 720. In addition, any new changes may be effective right after a "Browser Refresh" or a user may click on a "Reload." When a user logs in (or via a Browser Refresh), the newly added Static Query may be available on interface. The user may select a last name from the drop down and entered a search term, such as a last name and further click on the search button to retrieve the information.

With Audit View 154, an administrator may view a Logged In user's audit trail. This may be useful to perform an analysis on a user's need and/or choice as well as frequently used links and/or queries. For example, by looking at a report, an administrator user may identify time taken (in milliseconds) by a specific query, all or even a subset of queries to fetch the data from database. This may be used to optimize the query as well. Also, this feature assists in placement of the Important Links/Tables which are frequently searched by users.

Figure 9:
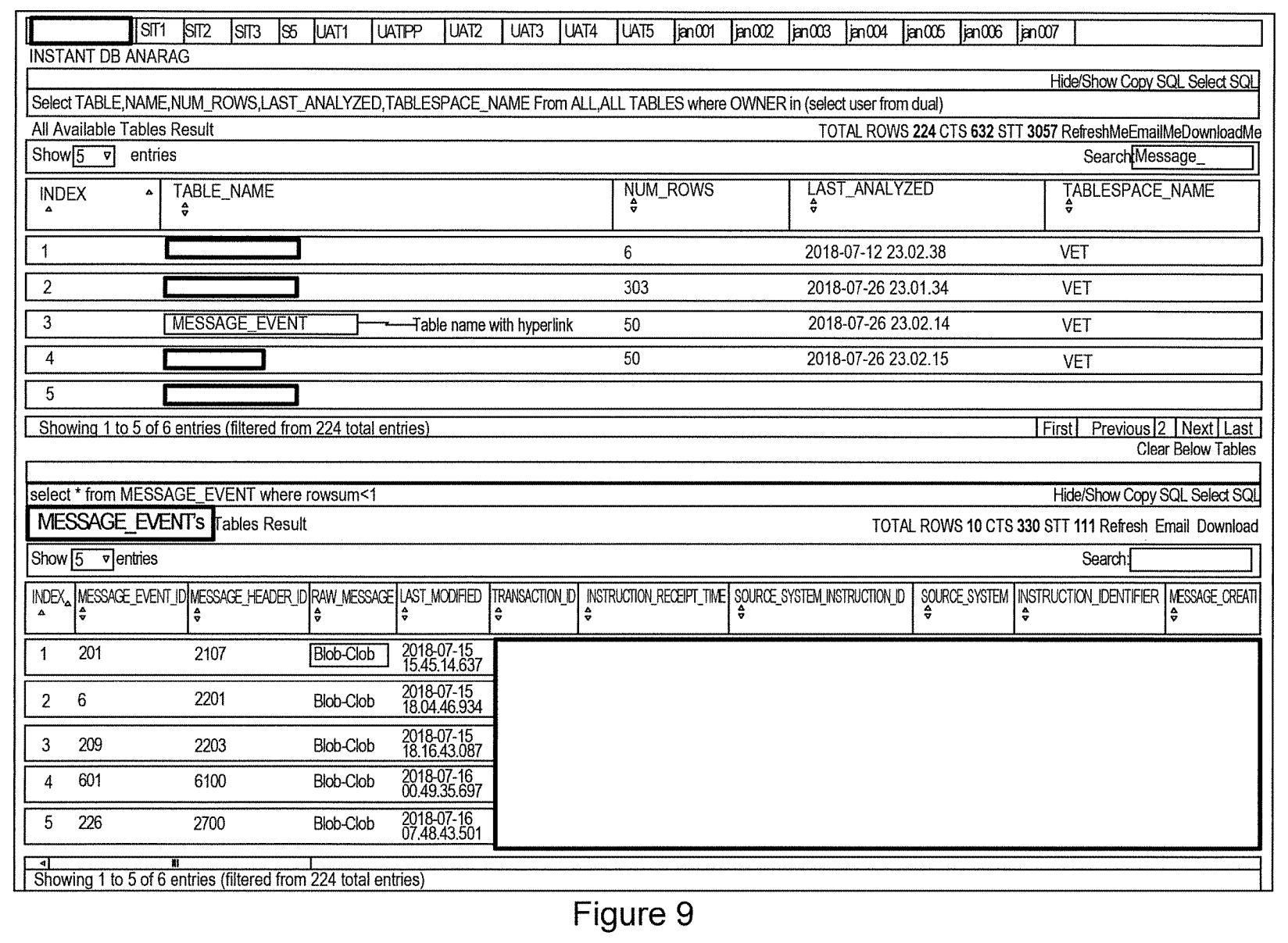

Developer 156 provides a list of all tables available into Database with hyperlinks, as shown by FIG. 8. FIGS. 8 and 9 represent exemplary Developer interfaces of a Database Actuator, according to an embodiment of the present invention. When a user clicks on any of the links/tables at 810, details of that table may be displayed under a second result set as shown in FIG. 9. With an all table/columns view, the interface provides details regarding the relationship between tables (e.g., all Primary/Foreign Keys). In addition, the user may search any textual information. This additional search feature may be available on various screens and results sets.

For example, if a user wants to see/know a particular String/Sub-String is stored into which data base tables, the user may type the search key string (e.g., like BOB) and hit the search button. The interface may provide the tables/columns where this text/string is stored and further provide a number of occurrences. Details of the data may be viewed by clicking on any row or link displayed.

Configuration 158 enables a user to configure general screen features which may include Labels, Browser's Title, Port Number, Authentication/Authorization Enable/Disable, Email From, etc. Configuration 158 may also provide environmental configurations (e.g., environments available for the user) and schema/group configurations (e.g., group names may be configured per naming convention, etc.).

Database Actuator Tool Interface 120 may access a plurality of databases and/or database systems, represented by 130, 132, 134, and 136. Each database may store and maintain various types of data and applications. Various types of databases may be supported, including relational databases, SQL servers, etc.

Interface 130 may be communicatively coupled to Databases 130, 132, 134 and 136. Databases 130, 132, 134 and 136 may include any suitable data structure to maintain the information and allow access and retrieval of the information. For example, Databases 130, 132, 134 and 136 may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

Databases may be any suitable storage device or devices. The storage may be local, remote, or a combination thereof with respect to Databases 130, 132, 134 and 136. Databases may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). Databases may have back-up capability built-in. Communications with Databases may be over a network, or communications may involve a direct connection between Databases and Interface 130, as depicted in FIG. 1. Databases 130, 132, 134 and 136 may also represent cloud or other network based storage.

Communication networks may be a wireless network, a wired network or any combination of wireless network and wired network. Also, the networks may support an Internet network, a wireless communication network, a cellular network, Bluetooth, or the like, or any combination thereof. Although network communication links are depicted as one network for simplicity, it should be appreciated that according to one or more embodiments, Networks may comprise a plurality of interconnected networks, such as, for example, a service provider network, the Internet, a cellular network, corporate networks, or even home networks, or any of the types of networks mentioned above. Data may be transmitted and received via Network utilizing a standard networking protocol or a standard telecommunications protocol.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 are depicted, it should be appreciated that other connections and relationships are possible. The system 100 described below may be used to implement the various methods herein, by way of example. Various elements of the system 100 may be referenced in explaining the exemplary methods described herein.

While FIG. 1 illustrates individual devices or components, it should be appreciated that there may be several of such devices to carry out the various exemplary embodiments.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

Figure 2:
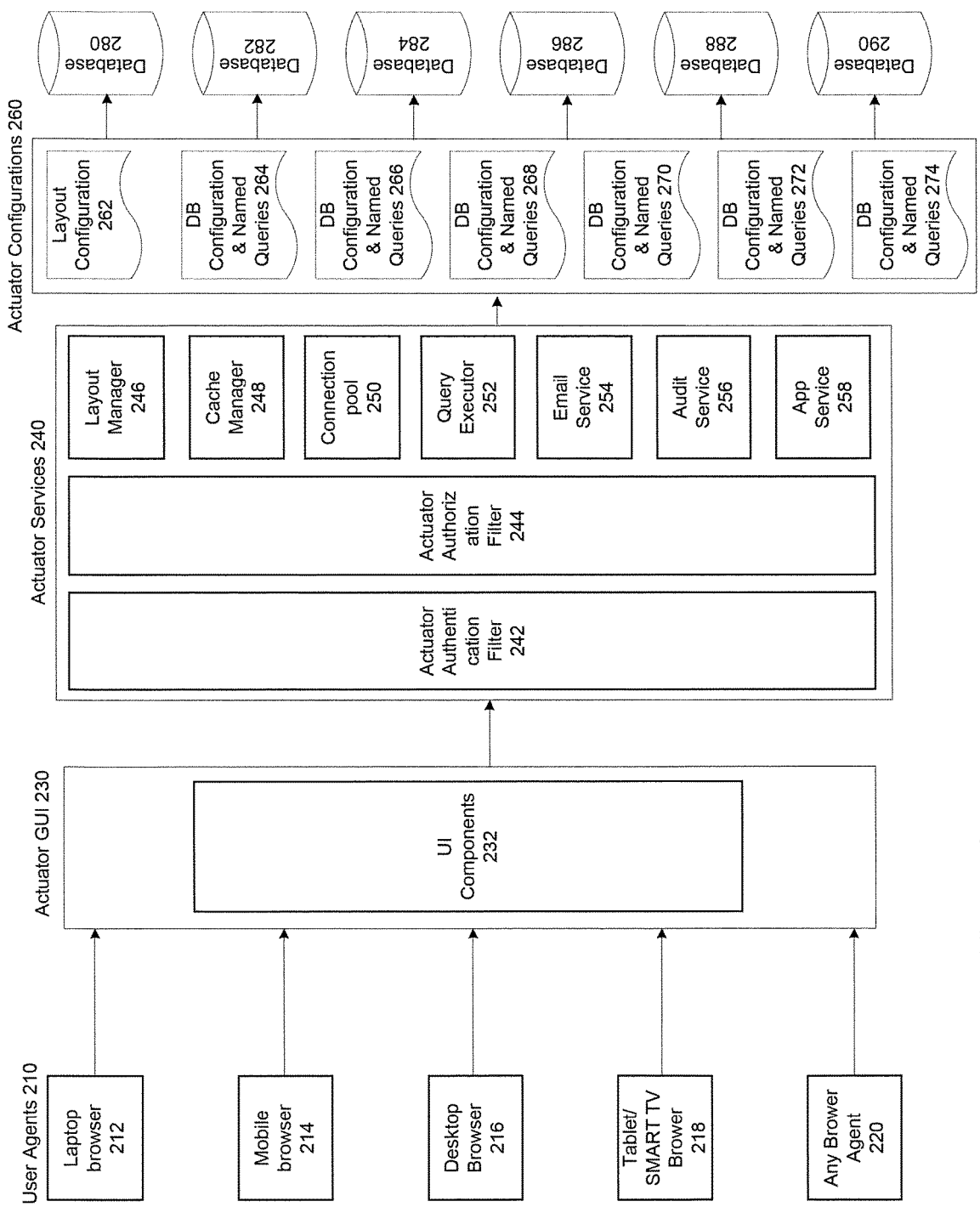
FIG. 2 is an exemplary architectural diagram of a system that implements a database actuator, according to an exemplary embodiment of the present invention.

FIG. 2 is an exemplary architectural diagram of a system that implements a database actuator, according to an exemplary embodiment of the present invention. As shown in FIG. 2, User Agents 210 may include browsers executing on various devices. User Agents 210 may include Laptop Browser 212, Mobile Browser 214, Desktop Browser 216, Tablet or Smart TV Browser 218, and essentially Any Browser Agent 220 executing on any user device. Actuator GUI 230 may include UI components 232. Actuator Services 230 may include an Actuator Authentication Filter 242 and Actuator Authorization Filter 244. Other services may include Layout Manager 246, Cache Manager 248, Connection Pool 250, Query Executor 252, Email Service 254, Audit Service 256 and Application Service 258. Actuator Configurations 260 may include Layout Configuration 262 and a series of Database Configuration and Named Queries represented by 264-274. Actuator Configurations may execute on various database, database servers and systems, as represented by Databases 280-290.

Figure 3:
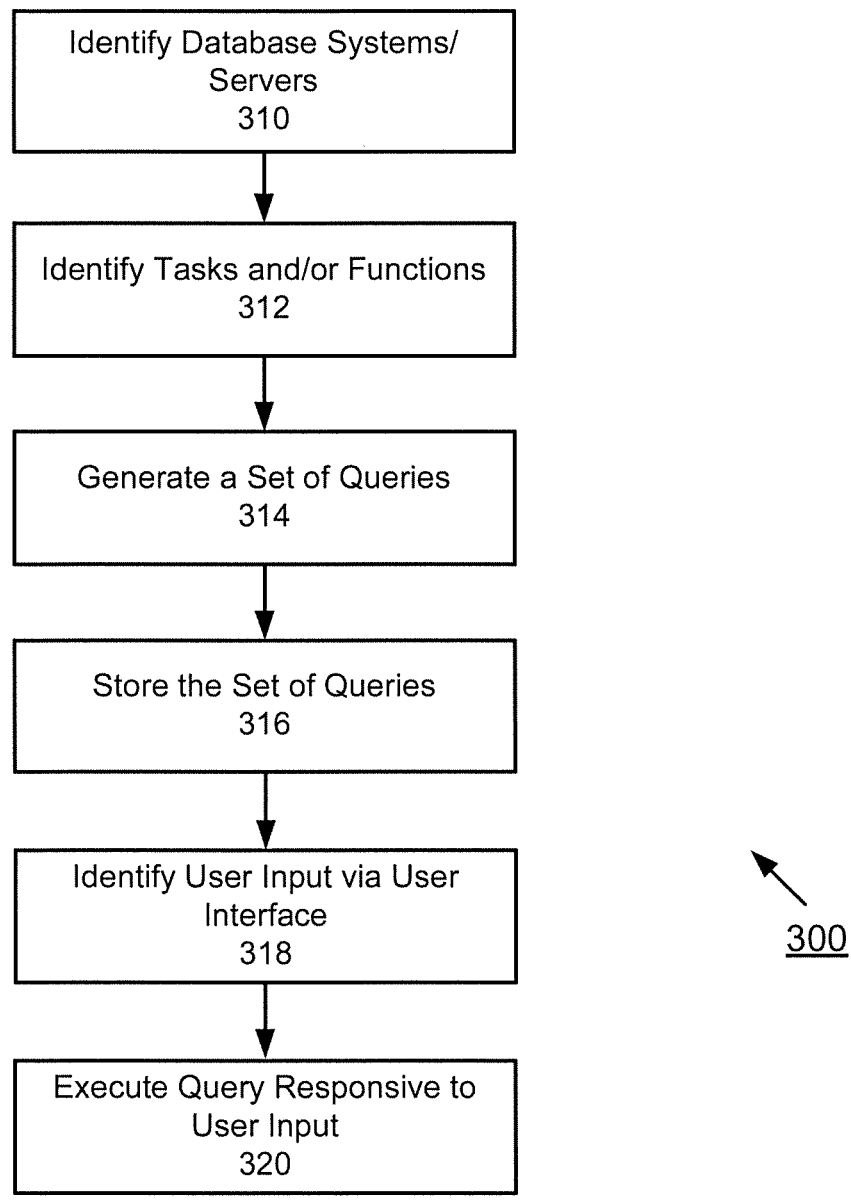
FIG. 3 is an exemplary flowchart that implements a database actuator, according to an embodiment of the present invention.

FIG. 3 is an exemplary flowchart that implements a database actuator, according to an embodiment of the present invention. At step 310, database systems and/or servers may be identified. At step 312, frequently used tasks and/or functions may be identified. The tasks and/or functions may be identified by a user and/or automatically identified based on prior historical data. At step 314, a corresponding set of queries may be generated. The queries may be SQL queries and/or other database specific queries. At step 316, the set of queries may be stored and made available for one or multiple environments. At step 318, user input may be received and identified via a user interface. At step 320, the system may execute a corresponding query responsive to the user input. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, FIG. 1 includes a number of communication devices and components, each of which may include at least one programmed processor and at least one memory or storage device. The memory may store a set of instructions. The instructions may be either permanently or temporarily stored in the memory or memories of the processor. The set of instructions may include various instructions that performing a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The components illustrated may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript, etc. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A method that implements database actuator tool to execute database queries, the method comprising the steps of:

electronically connecting with one or more database systems and servers;

identifying a set of frequently used tasks for the one or more database systems and servers based on historical use data;

responsive to the set of tasks, automatically generating a set of SQL queries that are preconfigured and made available via an interactive user interface that provides a single interface to search directly in the one or more database systems and servers; the set of SQL queries comprising:

one or more static queries that retrieve database information automatically without any user configuration of the static queries;

one or more dynamic queries that retrieve database information after (1) a user selection of a dynamic query identifier type and (2) a user input in a form of a search term, and wherein the interactive user interface displays a plurality of tables that are related for each query from the set of queries and upon a user selection of one of the plurality of tables, displays related data in a tabular format; and one or more nested queries that provide relationship data between a plurality of different tables;

storing the set of SQL queries in a database;

receiving, via the interactive user interface, a user input constituting a desire for a user to access information from the one or more database systems and servers;

authorizing the user to access some portion of the set of preconfigured SQL queries based on a security protocol for content visibility;

responsive to the user input and the user authorization, automatically executing one or more static queries from the set of SQL queries, via a query executor, wherein each static query structure is predefined and available on the interactive user interface;

receiving, via the interactive user interface, a selection by the user of a dynamic query identifier type from a drop-down window and an input from the user in the form of a search term associated with the selected dynamic query identifier;

responsive to the selected dynamic query identifier and the search term, automatically executing one or more dynamic queries from the set of queries, via the query executor; and create an audit trail comprising a list of the executed one or more static queries and one or more dynamic queries, an identification of one or more frequently used queries from the executed one or more dynamic queries, and optimize the one or more dynamic and static queries based on a time required to run one or more of the static and dynamic queries and a frequency parameter of the one or more frequently used queries;

apply the audit trail as feedback to (1) the identification of the set of frequently used tasks and (2) the placement of one or more links in the interactive user interface; and storing the static and dynamic queries for execution in multiple environments.

2. The method of claim 1, wherein the set of queries comprise SQL queries.

3. The method of claim 1, wherein the database actuator tool comprises a browser-based application.

4. The method of claim 1, wherein the database actuator tool is platform independent.

5. The method of claim 1, wherein the interactive user interface displays preconfigured nested queries with relationship data between multiple tables.

6. The method of claim 1, wherein the interactive user interface displays a set of preconfigured environments.

7. The method of claim 6, wherein each preconfigured environment comprises a set of preconfigured options and queries specific to the preconfigured environment.

8. The method of claim 1, wherein the static queries are preconfigured to retrieve information without user input.

9. The method of claim 1, wherein the dynamic queries are preconfigured and also responsive to a user search term.

10. The method of claim 1, wherein the interactive user interface displays a download feature for downloading search results into one or more user selected formats.

11. The method of claim 1, wherein the interactive user interface displays a communication option where query results are electronically sent to one or more recipients.

12. The method of claim 1, wherein the interactive user interface displays an administration interface that enables new queries to be created and added.

13. The method of claim 1, wherein the interactive user interface displays an administration interface that enables one or more queries to be updated.

14. The method of claim 1, wherein the interactive user interface displays an audit option.

15. The method of claim 1, wherein the interactive user interface displays a developer interface.

16. The method of claim 1, wherein the interactive user interface executes on a desktop browser.

17. The method of claim 1, wherein the interactive user interface executes on a mobile browser.

* * * * *